United States Patent
Beinroth et al.

(10) Patent No.: US 8,249,055 B2
(45) Date of Patent: Aug. 21, 2012

(54) METHOD FOR LOCALIZATION AND LOCATION-RELATED CONNECTION OF A MOBILE VOICE-OVER-IP SUBSCRIBER TO AN EMERGENCY CALL STATION

(75) Inventors: Achim Beinroth, Berlin (DE); Frank Erfurt, Kleinmachnow (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 165 days.

(21) Appl. No.: 12/293,211

(22) PCT Filed: Feb. 20, 2007

(86) PCT No.: PCT/EP2007/051606
§ 371 (c)(1),
(2), (4) Date: Feb. 19, 2009

(87) PCT Pub. No.: WO2007/107421
PCT Pub. Date: Sep. 27, 2007

(65) Prior Publication Data
US 2009/0219921 A1 Sep. 3, 2009

(30) Foreign Application Priority Data
Mar. 22, 2006 (DE) .......................... 10 2006 013 218

(51) Int. Cl.
*H04L 12/66* (2006.01)
*H04M 11/04* (2006.01)
*G06F 15/173* (2006.01)

(52) U.S. Cl. ........ 370/352; 379/37; 455/404.2; 709/242

(58) Field of Classification Search ........................ None
See application file for complete search history.

(56) References Cited

U.S. PATENT DOCUMENTS
6,041,114 A * 3/2000 Chestnut .................. 379/211.02
(Continued)

FOREIGN PATENT DOCUMENTS
WO WO 2005/077054 A 8/2005

OTHER PUBLICATIONS

Garcia-Martin et al., Private Header (P-Header) Extensions to the Session Initiation Protocol (SIP) for the 3rd-Generation Partnership Project (3GPP), Jan. 2003, IETF, RFC 3455.*

*Primary Examiner* — Timothy J Weidner
(74) *Attorney, Agent, or Firm* — Laurence A. Greenberg; Werner H. Stemer; Ralph E. Locher

(57) ABSTRACT

The invention relates to a method for localization and location-related connection of a mobile voice-over-IP subscriber to an emergency call station even when the subscriber is temporarily registered in the voice-over-IP network with an address of a location other than his home address (2). For this purpose, the voice-over-IP network comprises an address database which is either configured as a central or decentralized database and in which addresses are indexed with a location-related number. An address of the location of the subscriber is updated (3) by using the address range predefined in the address database and an emergency call is routed (6, 7, 8, 9, 10) to an associated emergency call station using the location-related number. The location-related number and data of the subscriber are then transmitted to the associated emergency call station (8, 9). The actual location of the subscriber emitting the emergency call is then determined in the emergency call station using the location-related number and querying the address database (11). The concept underlying the invention is to provide, in a simple manner and without major modifications to the voice-over-IP network, location-related information for voice-over-IP subscribers for the routing of emergency calls or for determining the actual location of a voice-over-IP subscriber.

9 Claims, 1 Drawing Sheet

U.S. PATENT DOCUMENTS

| | | |
|---|---|---|
| 7,058,385 B2 * | 6/2006 | Lauper .................. 455/404.1 |
| 7,602,886 B1 * | 10/2009 | Beech et al. ............... 379/45 |
| 7,734,019 B1 * | 6/2010 | Terpstra ..................... 379/37 |
| 7,843,903 B2 * | 11/2010 | Bakke et al. .............. 370/354 |
| 2002/0115432 A1 * | 8/2002 | Roeder ..................... 455/415 |
| 2004/0111640 A1 * | 6/2004 | Baum ....................... 709/224 |
| 2004/0190497 A1 | 9/2004 | Knox |
| 2005/0007999 A1 * | 1/2005 | Becker et al. ............ 370/352 |
| 2005/0190892 A1 | 9/2005 | Dawson |
| 2005/0213716 A1 * | 9/2005 | Zhu et al. .................... 379/45 |
| 2006/0013378 A1 * | 1/2006 | Torii ..................... 379/212.01 |
| 2006/0039539 A1 * | 2/2006 | Goldman et al. .......... 370/352 |
| 2007/0060097 A1 * | 3/2007 | Edge et al. .............. 455/404.1 |
| 2007/0121598 A1 * | 5/2007 | McGary .................... 370/356 |
| 2008/0101552 A1 * | 5/2008 | Khan et al. ............... 370/352 |
| 2009/0196284 A1 * | 8/2009 | Beinroth .................. 370/352 |

* cited by examiner

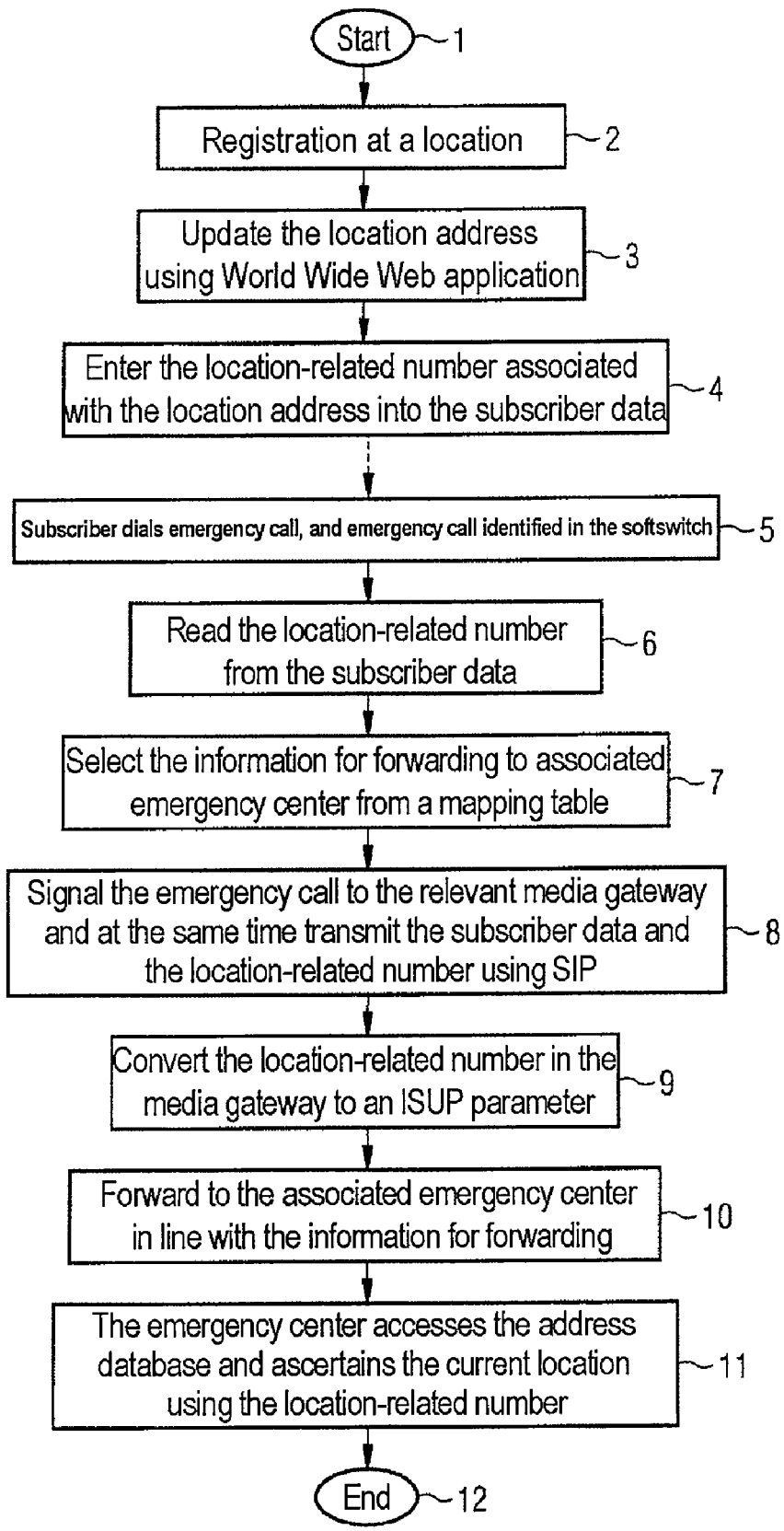

METHOD FOR LOCALIZATION AND LOCATION-RELATED CONNECTION OF A MOBILE VOICE-OVER-IP SUBSCRIBER TO AN EMERGENCY CALL STATION

CLAIM FOR PRIORITY

This application is a national stage application of PCT/EP2007/051606, filed Feb. 20, 2007, which claims the benefit of priority to German Application No. 10 2006 013 218.1, filed Mar. 22, 2006, the contents of which hereby incorporated by reference.

TECHNICAL FIELD OF THE INVENTION

The invention relates to a method for localization and location-related relaying of a subscriber in a Voice-over-IP network to an emergency center, wherein the subscriber may intermittently also be registered at a location other than a home address in the Voice-over-IP network.

BACKGROUND OF THE INVENTION

Voice-over-IP is understood in the generally accepted sense to mean telephoning via a computer network which, like the Internet, for example, is based on the foundation of the "Internet protocol", or IP protocol for short. In the case of Voice-over-IP, the voice signals are digitized and are transmitted in the form of data packets via a "packet-oriented network" instead of via connected lines, as in a "conventional" circuit-switched telephone network such as the "landline network" or a mobile radio network.

Protocols which are used to forward digitized voice signals in IP-based computer networks are generally also called Voice-over-IP protocols. The computer networks in which Voice-over-IP telephony is made possible can also be referred to as Voice-over-IP networks.

Voice-over-IP telephony can furthermore be used only within an IP-based computer network in a company or an institution (e.g. in a local area network or in an Intranet) or else on the public Internet. The use on the public Internet is also referred to as Internet telephony in the narrower sense. For a subscriber, however, there is barely a difference between telephoning in a Voice-over-IP network and telephoning in a conventional telephone network such as the landline network or a mobile radio network.

A telephone call in a Voice-over-IP network is divided into two processes in exactly the same way as a telephone call in the landline network or in a mobile radio network, for example: setup of the connection and transmission of the call. By way of example, incoming telephone calls are forwarded to the terminal of a called Voice-over-IP subscriber—in exactly the same way as in the case of conventional telephony.

However, Voice-over-IP telephony can be used from any access facility to a Voice-over-IP network (e.g. Intranet, in-house IP-based LAN) or Internet telephony can be used from any Internet access facility by dialing up a service computer which is available on the Internet—what is known as a server, which is operated by an Internet telephony provider. This means that there is no longer a predefined association between a subscriber identification such as a subscriber telephone number and a particular geographical address—for example comprising city, road, house number, etc.—or a particular location.

In addition, what is known as an emergency call requires knowledge of the location or the geographical address of a subscriber making the emergency call. In this context, an emergency call denotes a signal which is usually sent by means of a telecommunication terminal in order to reach professional help, such as ambulance, fire brigade, police, etc. Usually, these assistance organizations can be reached on special telephone numbers—what are known as emergency numbers.

In this case, emergency numbers are special numbers in the "numbering scheme" which stipulate the sum of all specifications relating to the format and designation of dialing digits and digit combinations in telecommunication networks. Usually, these emergency numbers comprise three digits and are valid within a country for which a particular numbering scheme is defined. Emergency numbers may therefore differ from country to country. In addition, the European Union has what is known as a European emergency number—the digit combination 1-1-2—which can be used to reach professional assistance services such as ambulance, fire brigade or police in any country. The European emergency number is also used as an emergency number in mobile radio networks. Within a national area, assistance services such as ambulance, fire brigade or police can likewise be reached on the national emergency numbers (e.g. in Germany 1-1-0 for police, 1-1-2 for ambulance or fire brigade).

In addition, there may be other assistance services such as an emergency medical assistance service, breakdown services, automobile clubs, etc., which can be contacted on special telephone numbers—often likewise three-digit-numbers which are standard in the area of a country.

Since emergency numbers or telephone numbers for other assistance services are usually standard for the entire area of a country or the European Emergency call, which is valid in the entire area of the European Union, is used in mobile radio networks, it is necessary to know, for an emergency call, the location of the subscriber making the emergency call so that he can be connected to an emergency center which is closest or competent. For further assistance, it is additionally necessary to transmit to this emergency center information about the location (e.g. city, road, house number, etc.) of the subscriber making the emergency call.

According to currently applicable law, an operator of a public telephone network or a provider of telecommunication services for the public in Germany or Austria, for example, is obliged to ensure the connections to an emergency number are set up and hence routed to the respective emergency centers. For the transmission of the location data, it is currently true in Austria, for example, that a telecommunication network operator is to provide information about master data and location data only at the request of the operator of an emergency service. In this case, location data are those data which are processed in a communication network and from which the location of a telecommunication terminal belonging to a subscriber to a public communication service needs to be indicated.

In the landline network, source-dependent routing can be used for transmitting the emergency call to the closest or competent emergency center. In this case, the telephone number of the subscriber is taken and the closest or competent emergency center is ascertained, and this telephone number is then forwarded to the emergency center. By way of example, the location of the subscriber making the emergency call is then established using the transmitted telephone number of the subscriber, since the telephone number is often coupled to the address of the subscriber and hence to his location by the network operator, for example, for charging purposes.

In mobile radio networks, the emergency call is routed to the closest or competent emergency center using that radio cell to which the subscriber making the emergency call has set up a connection using his terminal, for example. With the assistance of the network operator, the emergency center can then establish the approximate location of the subscriber making the emergency call, e.g. using the position of the radio cell. More accurate position finding for the subscriber making the emergency call in a mobile radio network can be achieved by using information about signal delay time and reception field strength, and also by using new techniques such as the satellite navigation system Global Positioning System (GPS) or by means of Assisted GPS (A-GPS), for example.

For Voice-over-IP networks, although it is likewise true, according to the applicable law, that it is necessary to ensure that connections are set up to emergency numbers and routed to the respective emergency center, there is currently no regulation regarding the transmission of the location data. In Austria, for example, it is true that, provided that no location data are being processed in the operator's network—as may be the case in Voice-over-IP networks, for example—there is no legal obligation for the operator to transmit location data to the operator of an emergency service.

Efforts are therefore currently being made in Europe—in similar fashion to in the USA—to enact regulations for Voice-over-IP networks such that Voice-over-IP subscribers also reach the closest or competent emergency center among the respective emergency numbers, with information about the location of the subscriber or his terminal making the emergency call also being intended to be transmitted to the emergency center. It is therefore necessary for an association between a subscriber identification (e.g. subscriber telephone number, etc.) and location data to be made available in the Voice-over-IP network.

In Voice-over-IP networks, it is possible to distinguish between what are known as nonmobile Voice-over-IP subscribers and what are known as mobile Voice-over-IP subscribers. Nonmobile Voice-over-IP subscribers always use the same access facility (e.g. home workstation, fixed office workstation) to the Voice-over-IP network or to the Internet for the purpose of using Voice-over-IP or Internet telephony. The address (e.g. city, road, house number, etc.) of this access facility may also be referred to as the home address of the subscriber.

For these nonmobile subscribers, it is possible to use source-dependent routing for emergency calls as in the landline network, since the location of the subscriber is usually known and is not changed. To this end, subscriber data such as a subscriber identification or subscriber telephone number in the Voice-over-IP network are statically linked to routing information in order to reach the closest or competent emergency center in this way. For the purpose of localization of the subscriber, the emergency center can be sent a subscriber identification (e.g. subscriber telephone number) which is used in the emergency center to find out the location data of the subscriber making the emergency call, for example by querying a database maintained by the network operator.

In contrast, mobile Voice-over-IP subscribers are intermittently also registered at locations other than their home address when using Voice-over-IP or Internet telephony. This means that they use not only a home address (e.g. office workstation, home workstation, etc.) but also other access facilities to the Voice-over-IP network or Internet, for example—such as a second office at another location of a company, Internet access in a hotel, partial working at a home workstation, etc.

At least intermittent use of different access facilities to the Voice-over-IP or Internet means that there is no longer a fixed association between a subscriber identification, such as a subscriber telephone number, and a particular location, and the Voice-over-IP network therefore has no location data available for the mobile Voice-over-IP subscriber. It is therefore currently not possible to use source-dependent routing for emergency calls and the Voice-over-IP subscriber making the emergency call cannot be localized in the emergency center.

SUMMARY OF THE INVENTION

The present invention discloses a method which easily provides information for location-related forwarding of emergency calls and for localization of a Voice-over-IP subscriber.

In one embodiment of the invention, there is a method of the type indicated at the outset, wherein the Voice-over-IP network comprises an address database in which addresses are indexed with a location-related number, then a predefined address range stored in the address database is used to update an address for the location of a subscriber, and then an emergency call is routed to an associated emergency center using the location-related number. The location-related number and data from the subscriber are then transmitted to the associated emergency center, and the emergency center then uses the location-related number to ascertain the current location of the subscriber making the emergency call by querying the address database in the Voice-over-IP network.

In one aspect according to the invention, a location-related information for Voice-over-IP subscribers is provided easily and without any great changes in the Voice-over-IP network or on interfaces between the Voice-over-IP network and other networks (e.g. a landline network, etc.) for the purpose of location-dependent forwarding of emergency calls or for the purpose of determining the current location of a Voice-over-IP subscriber. To this end, an address database is introduced in the Voice-over-IP network, into which address database a predefined address range or a valid address book is imported which includes, by way of example, address data from the geographical area covered by the Voice-over-IP network and which is possibly periodically updated so as also to provide, by way of example, changes as a result of roads being renamed or changes to the house number or network extensions, for example. The addresses stored in the database are then indexed using a location-related number. By way of example, this location-related number is then stored as an entry with the subscriber data, e.g. in the softswitch, and is therefore used as a reference to the current location of the Voice-over-IP subscriber. The proposed solution can therefore be introduced into existing network elements (e.g. softswitch) of the Voice-over-IP network without influencing the performance for call handling in any great way.

It is advantageous if the location-related number is linked to information for forwarding to the respective associated emergency center by means of a mapping table. Such mapping, for example onto routing information available in the network elements (e.g. softswitch, media gateway, etc.), barely delays the setup of an emergency call, since only the current location-related number of a subscriber needs to be requested from the address database and the routing information is accessed via the mapping table.

Another advantage of the invention is that the pre-initialization entered is the location-related number of the home address of the subscriber. In this case, the home address is usually that address at which a subscriber is principally registered in the Voice-over-IP network. Usually, this address is already used by the operator of the Voice-over-IP network for charging purposes and is therefore available.

In one aspect, the address of the respective current location of the subscriber to be updated using a World Wide Web interface. Since particularly a mobile Voice-over-IP subscriber often uses the services provided by the Voice-over-IP network using an access facility to the Internet and the World Wide Web is a service provided by the Internet, the subscriber can easily provide notification of the respective current location when dialing into the Voice-over-IP network—for example by selecting the address of the current location from an address list which is provided by a World Wide Web application and which is based on the address range predefined in the address database. Input of the current location then enters a location-related number in the data from the subscriber as a reference to the address of the current location. The current location of the subscriber can therefore be ascertained for an emergency call using this stored location-related number.

In one embodiment of the invention, the input address of the respective current location of the subscriber is provided with a validity period if it differs from the home address. This saves the subscriber from updating the location address again, for example when the subscriber accesses the Voice-over-IP network at his home address again. This is because when the validity period has expired it is possible for the location-related number stored in the subscriber's data to be reset again to that location-related number which indexes the home address, for example.

In another aspect, confirmation of the address of the respective current location of the subscriber is requested periodically. This easily ensures that the address of the current location of the Voice-over-IP subscriber is always available for forwarding emergency calls or for localizing him in the Voice-over-IP network.

In still another aspect of the invention, the address database is provided centrally or locally in the Voice-over-IP network. The address database can be provided centrally in the Voice-over-IP network, which allows the predefined address range to be updated and maintained easily. On the other hand, the address database may also be in local form, with the entire database being provided on every relaying network element (e.g. softswitch), for example, and then being used by the respective network element for routing the emergency calls (e.g. requesting the location-related number in a subscriber's data) to the respective associated emergency centers.

In yet another embodiment of the invention, the location-related number is transmitted by means of an SIP interface to a media gateway in a P-Access-Network-Info header based on RFC 3455. The "Session Initiation Protocol" SIP was developed by the IETF (Internet Engineering Task Force). It defines a signaling protocol for setting up, modifying and terminating sessions with two or subscribers and is likewise used for transmitting realtime data via packet-oriented networks, such as for relaying voice via IP networks. To cross to another network—such as a conventional telecommunication network like the landline network—what are known as switching computers or media gateways are used. In this case, the media gateway is connected firstly to the Voice-over-IP network and secondly to the other telecommunication network, to which the emergency center is connected, for example. The media gateway then receives the requests from the Voice-over-IP network, for example via an SIP interface, this interface being able to be defined by a "Request for Comment" RFC—RFC 3455—from the IETF. These requests are then forwarded to the other telecommunication network by the media gateway. Using the SIP interface defined by RFC 3455 affords the advantage that this already defined interface need only be extended by a parameter for the location-related number.

In still another aspect, the location-related number is converted by the media gateway to an ISUP parameter "Location Number" for forwarding to the respective emergency center. For forwarding the emergency call to the other telecommunication network—e.g. the landline network, which is in the form of a public switched telephone network or circuit-switched telephone network—the parameter for the location-related number needs to be converted into a parameter from a signaling protocol used in this network. In the landline network, the signaling system used is what is known as Signaling System No. 7, for example, standardized by the ITU-T, which uses what is known as the ISDN User Part or ISUP in order to use services and service features in the ISDN. In the ISUP, a "Location Number" parameter is provided which can therefore easily be used for forwarding the location-related number, e.g. in the landline network, to the emergency center.

In one embodiment, the location-related number is stored in a format from the recommendation E.164 in the address database. Recommendation E.164 from the ITU-T is deemed a recommendation for a numbering scheme, wherein a numbering scheme comprises the sum of all specifications relating to the format and significance of dialing digits and digit combinations in telecommunication networks. Recommendation E.164 from the ITU-T was developed in particular in view of ISDN. It permits a maximum of 15 plus 40 ISDN subaddresses. If the location-related number is designed on the basis of the recommendations of E.164, it can easily be transmitted and evaluated by telecommunication networks in which this ITU-T recommendation is implemented.

BRIEF DESCRIPTION OF THE INVENTION

The invention is explained in more detail below by way of example with reference to the figures, in which:

FIG. 1 shows an exemplary flow of the method according to the invention.

DETAILED DESCRIPTION OF THE INVENTION

With reference to FIG. 1, the method according to the invention begins at step 1. In step 2, a Voice-over-IP subscriber registers at an access facility to a Voice-over-IP network at a location, which may differ from a home address, in order to use services provided by the Voice-over-IP network, such as IP telephony. In this case, the home address is the location at which the Voice-over-IP subscriber principally uses the Voice-over-IP network or services provided by it. In addition, the home address is the address which is entered as the pre-initialized address for the location of the subscriber in the Voice-over-IP network.

In step 3, the Voice-over-IP subscriber updates the location address. To this end, the Voice-over-IP subscriber can be provided with a World Wide Web application, for example by a Voice-over-IP provider, which is used to present the Voice-over-IP subscriber with, by way of example, an address—e.g. comprising city, road, house number, etc.—from an address database in the Voice-over-IP network. The address database is accommodated in the Voice-over-IP network and, by way of example, comprises a defined address space from a geographical area which is covered by the Voice-over-IP network of the Voice-over-IP provider. In addition, the addresses in this address database are indexed by a location-related number, for example in the E.164 format. The Voice-over-IP subscriber can then use the World Wide Web applications to select the address of his current location. Next, in step 4, what is known as a web server, for example, is used to read the location-related number associated with the address of the current location from the address database and to store it in data from the subscriber (e.g. subscriber identification, etc.) which are stored on a relaying network element, such as a softswitch.

If the Voice-over-IP subscriber now dials an emergency call or an emergency number in step 5, this emergency call is first of all recognized in the relaying network element—e.g. in the softswitch—from the dialed telephone number. In step 6, the location-related number stored in the subscriber data on the softswitch is then read, the number referencing the address of the current location of the subscriber. In step 7, the location-related number is used to ascertain from a mapping table, which is stored on the relaying network element (e.g. softswitch), for example, information for forwarding the emergency call to an associated emergency center—for example the closest emergency center.

Since emergency centers are usually situated outside of a Voice-over-IP network or are connected to other telecommunication networks, such as the landline network, what is known as a switching computer or a media gateway is used in order to cross between the Voice-over-IP network and another telecommunication network. The media gateway then converts calls from the Voice-over-IP network, which are received in signaling protocols of the Voice-over-IP network, such as SIP, into the other telecommunication network, wherein signaling protocols of the other telecommunication network—e.g. ISUP in the landline network—are used for the signaling.

In step 8, the emergency call is therefore signaled to a media gateway which corresponds to the forwarding information from the mapping table. In this case, the subscriber data and the location-related number are transmitted using the signaling protocol—for example SIP. The location-related number may be stored as a parameter in a P-Access-Network-Info header based on RFC 3455 from the IETF, for example.

In step 9, the media gateway then converts the location-related number to a parameter in the signaling protocol of the other telecommunication network. To this end, the ISUP parameter "Location Number" can be used when using ISUP, for example. In step 10, the emergency call together with the data from the subscriber (e.g. subscriber identification) and the location-related number is then forwarded to the associated emergency center in the other telecommunication network in line with the information for the forwarding which has come from the mapping table, and which has likewise been sent to the media gateway.

In step 11, the address database in the Voice-over-IP network is then accessed in order to request the location of the subscriber making the emergency call. In this case, the location-related number transmitted with the emergency call is used as a database key in order to read the address of the location from the database. Should the location-related number be unavailable in the emergency center—e.g. as a result of disruptions in one of the telecommunication networks involved in transmission of the emergency call, as a result of problems in the conversion at the media gateway, etc.—then it continues to be possible, for example using the subscriber identification or subscriber telephone number, to query databases in the Voice-over-IP network, e.g. for charging purposes, for the administration of subscribers, etc., or to query the address database for static address information—such as the home address.

The invention claimed is:

1. A method for localization and location-related relaying of a subscriber in a Voice-over-IP network to an emergency center, wherein the subscriber may intermittently be registered at a location other than a home address of the subscriber, comprising:
    providing the Voice-over-IP network with an address database;
    indexing addresses in the address database with location-related numbers and using a location-related number in the address database to indicate a current location of the subscriber;
    initializing the location-related number to identify the home address of the subscriber, wherein the home address at least identifies a city and a road;
    when the subscriber inputs a current address indicating that the current location of the subscriber is different from the home address, setting the location-related number to indicate the current address;
    at an expiration of a validity period of the current address indicating the current location, resetting the location-related number to identify the home address of the subscriber;
    routing an emergency call to an associated emergency center using the location-related number;
    transmitting the location-related number together with data from the subscriber to the associated emergency center; and
    ascertaining the current location of the subscriber making the emergency call using the location-related number by querying the address database.

2. The method as claimed in claim 1, wherein the location-related number is linked to information for forwarding to the respective associated emergency center by means of a mapping table.

3. The method as claimed in claim 1, wherein the current address of the subscriber is updated using a World Wide Web interface.

4. The method as claimed in claim 1, wherein confirmation of the current address of the subscriber is requested periodically.

5. The method as claimed in claim 1, wherein the address database is provided centrally or locally in the Voice-Over-IP network.

6. The method as claimed in claim 1, wherein the location-related number is transmitted by means of an SIP interface to a media gateway in a P-Access-Network-Info header based on Request for Comment RFC 3455.

7. The method as claimed in claim 1, wherein the location-related number is converted by a media gateway to an ISUP parameter "Location Number" for forwarding to the respective emergency center.

8. The method as claimed in claim 1, wherein the location-related number is stored in a format from a recommendation E.164 in the address database.

9. The method as claimed in claim 1, wherein the validity period is a predefined period of time.

* * * * *